United States Patent [19]
Sloan et al.

[11] Patent Number: 5,635,711
[45] Date of Patent: Jun. 3, 1997

[54] APPARATUS AND METHOD FOR THE SUPPRESSION OF MICROPHONIC NOISE IN PROPORTIONAL COUNTERS FOR BOREHOLE LOGGING-WHILE-DRILLING

[75] Inventors: W. Robert Sloan; Jacques M. Holenka, both of Missouri City, Tex.; Philip L. Kurkoski, London, England

[73] Assignee: Schlumberger Technology Corporation, Sugar Land, Tex.

[21] Appl. No.: 637,567

[22] Filed: Apr. 25, 1996

Related U.S. Application Data

[60] Provisional application No. 60/011,050, Jan. 25, 1996.

[51] Int. Cl.⁶ .............................. G01T 3/00; G01T 1/185
[52] U.S. Cl. ...................... 250/254; 250/262; 250/390.01
[58] Field of Search ................................. 250/254, 262, 250/390.01

[56] References Cited

U.S. PATENT DOCUMENTS

| | | |
|---|---|---|
| Re. 34,975 | 6/1995 | Orban et al. . |
| 4,348,671 | 9/1982 | Nussbaum ............................ 340/853 |
| 4,479,564 | 10/1984 | Tanguy . |
| 4,637,479 | 1/1987 | Leising . |
| 4,879,463 | 11/1989 | Wraight et al. . |
| 5,017,778 | 5/1991 | Wraight . |
| 5,023,450 | 6/1991 | Gold . |
| 5,091,644 | 2/1992 | Minette . |
| 5,237,540 | 8/1993 | Malone . |
| 5,397,893 | 3/1995 | Minette . |
| 5,473,158 | 12/1995 | Holenka et al. . |
| 5,483,061 | 1/1996 | Sloan ...................................... 250/254 |

FOREIGN PATENT DOCUMENTS

400865  10/1973  U.S.S.R. ......................... 250/390.01

*Primary Examiner*—Constantine Hannaher
*Attorney, Agent, or Firm*—Gary L. Bush; Wayne I. Kanak

[57] ABSTRACT

A method and apparatus is disclosed for suppressing microphonic noise in proportional counter neutron detection in borehole logging-while-drilling measurements. Noise is reduced by (1) applying the outputs of two detectors respectively to positive and negative inputs of a differential amplifier; (2) generating output pulses by applying the output of the differential amplifier to positive and negative comparators to produce first and second output pulses; (3) counting output pulses as neutron counts only if the first or second output pulses have time lengths less than a predetermined time length; and (4) rejecting the output pulses in the count of pulses as neutron counts if first and second output pulses coincide in time.

10 Claims, 5 Drawing Sheets

APPARATUS AND METHOD FOR THE SUPPRESSION OF MICROPHONIC NOISE IN PROPORTIONAL COUNTERS FOR BOREHOLE LOGGING-WHILE-DRILLING

CROSS-REFERENCE TO RELATED APPLICATION

This application claims priority from provisional application Ser. No. 60/011,050, filed Jan. 25, 1996.

BACKGROUND OF THE INVENTION

1. Field of the Invention

This invention relates generally to the use of proportional counters for neutron detection during borehole logging. In particular, this invention relates to an apparatus and method for the suppression of proportional counter microphonic noise produced by high amplitude mechanical shocks inherent in the process of borehole drilling.

2. Description of the Related Art

The use of proportional counters for neutron detection in borehole logging-while-drilling is made extremely difficult by high amplitude mechanical shocks inherent in the borehole drilling environment. Typically, such shocks cause mechanical displacements of the components within the proportional counters as well as mechanical displacements of the electronic components attached to the proportional counters. When there are component movements within a proportional counter, modulation of the effective capacitance of the detector in the proportional counter occurs. This modulation, coupled with the high voltage bias applied to the proportional counter, causes a current to flow that produces a signal in the electronic preamplifier of the counter. Such signal is generally referred to as microphonic noise. If the magnitude of the microphonically produced current is significant, the signal in the form of a voltage pulse, produced at the preamplifier's output will exceed the threshold of the voltage pulse discriminator connected to the preamplifier output. This results in microphonic noise being mistakenly counted as a neutron detection event.

In a typical logging-while-drilling neutron measurement, arrays of proportional counters are placed at various distances from the neutron source. The ratios of the count rates from these arrays are related to the properties of the formation surrounding the borehole. The set of counters farthest from the borehole may record only a few tens of counts per second (cps). Because of the low count rates, the counters farthest from the source are particularly susceptible to false neutron counts caused by additive microphonic noise. Just a few extra counts per second in these counters from microphonic noise can significantly bias the determination of geological information computed from counter array ratios.

U.S. Pat. No. 5,023,450 which issued Jun. 11, 1991 describes the problem of microphonic generation of noise in thermal neutron detectors used in measuring-while-drilling (MWD) systems. The '450 patent, incorporated herein for its description of the environmental forces applied to neutron detectors in a measuring-while-drilling system, describes a circuit for common mode rejection of noise. The '450 patent illustrates two detectors provided in a drill collar to detect neutron count rate. The output of one detector is connected to the positive input of a differential amplifier. The output of the second detector is connected to the negative input of such differential amplifier. Common vibration induced signals of the two detectors are canceled at the output of the differential amplifier.

The '450 patent disclosure assumes that neutrons returning from the earth formations surrounding the borehole will impinge on the two detectors at different times. Accordingly, the output of the differential amplifier produces a pulse stream representative of neutrons striking the two detectors.

In practice however, noise pulses do contaminate the output stream of the differential amplifier. The '450 patent disclosure provides no means for identifying noise pulses of such output stream and eliminating them from a pulse count in order to further reduce micro-phonic noise from a measured neutron count rate.

An object of this invention is to provide a method and electronic apparatus for suppressing proportional counter microphonic noise generated during borehole logging-while-drilling operations.

SUMMARY OF THE INVENTION

The microphonic noise suppression of the method and apparatus of this invention is embodied in equipment which includes a differential amplifier responsive to two $He^3$ neutron detectors spaced at two different radial locations on a logging-while-drilling apparatus. Two voltage pulse discriminating circuits and electronic circuitry are provided to identify and measure the length of pulses from the differential amplifier. The invention suppresses proportional counter microphonic noise in three different ways.

First, certain coherent microphonically generated noise between the two $He^3$ detectors is canceled through the use of a differential amplifier. Second, a microprocessor and electronic circuits are used to detect and distinguish a neutron detection pulse from microphonic noise based on the expected time length of a neutron pulse by counting pulses only if they have a time length less than a predetermined amount. Third, a secondary level of logic is applied in the microprocessor to not count coincident pulses between sets of pulses originating in each of the two $He^3$ detectors.

BRIEF DESCRIPTION OF THE DRAWINGS

The objects, advantages and features of the invention will become more apparent by reference to the drawings which are appended hereto and wherein an illustrative embodiment of the invention is shown, of which.

DESCRIPTION OF THE PREFERRED EMBODIMENT

The preferred embodiment of the invention described below is in a system like that of a logging-while-drilling system for measuring formation characteristics as a function of angular position within a borehole. Such system is described in U.S. Pat. No. 5,473,158 which is incorporated by reference herein.

Although the preferred application of the invention described below is in a logging-while-drilling system in general, and specifically like that of U.S. Pat. No. 5,473,158, the invention may find application in any neutron detector system, whether a system designed for logging-while-drilling applications or for open hole wireline logging operations.

Figure 1:
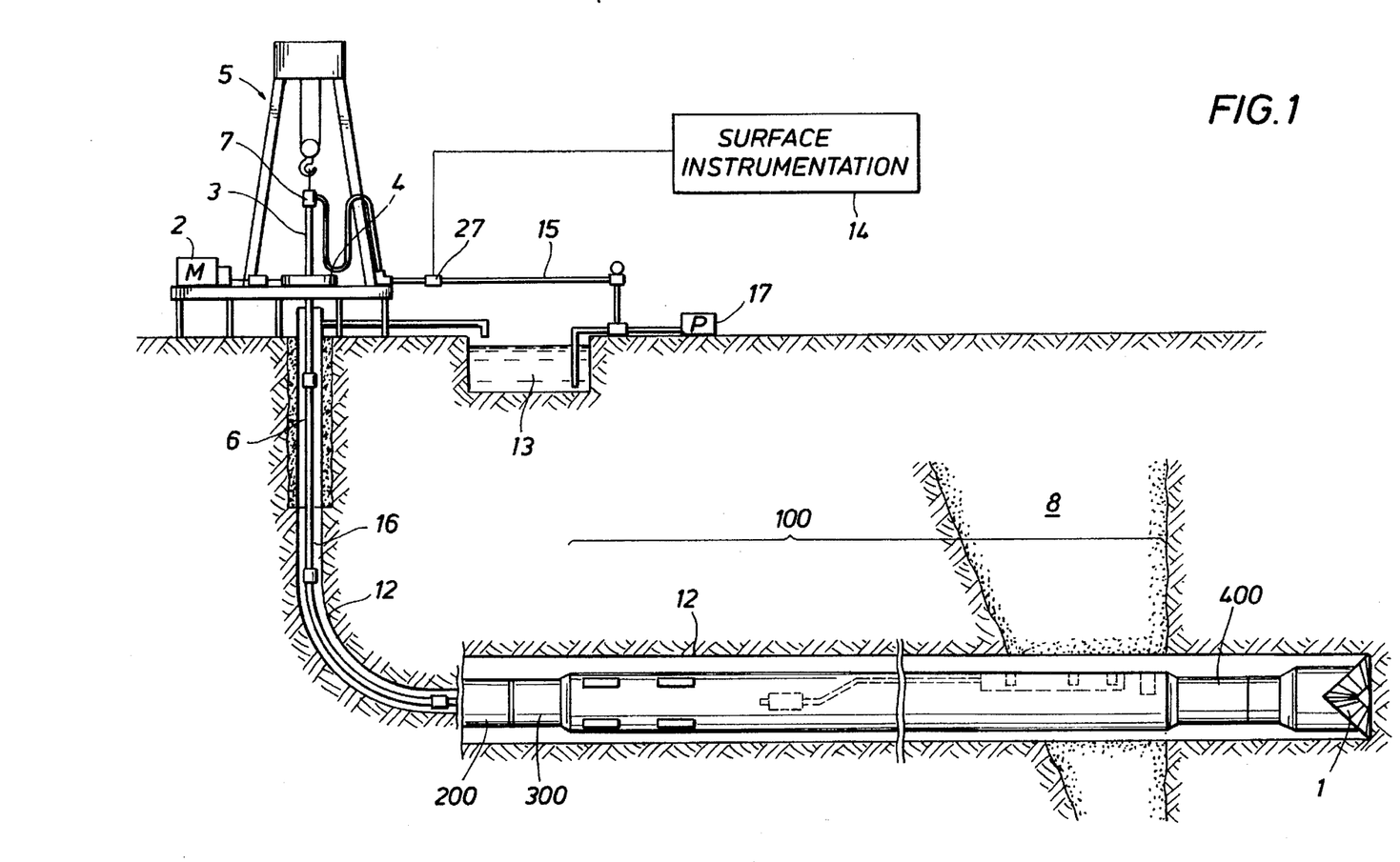
FIG. 1 is an illustration of a logging-while-drilling system including a neutron detector apparatus within which the invention is incorporated.

FIG. 1 illustrates a preferred embodiment in which the invention is incorporated. A logging-while-drilling (LWD) tool 100 is connected in tandem with a drilling assembly including drill bit 1. An associated downhole electronics module 300 and measuring-while-drilling (MWD) tool 200 including magnetometers and accelerometers are also connected in tandem with LWD tool 100. Module 300 may be a separate "sub" or it may be disposed in the body of LWD tool 100. A communication sub 400 is also provided in the drilling assembly.

The LWD tool 100 is shown for illustration purposes as being in an inclined portion of a borehole at the end of a drill string 6 which turns in a borehole 12 which is formed in formation 8 by penetration of bit 1. Of course, the drilling assembly may also be in the vertical portion of the borehole. A drilling rig 5 turns drill string 6. Drilling rig 5 includes a motor 2 which turns a kelly 3 by means of a rotary table 4. The drill string 6 includes sections of drill pipe connected end-to-end to the kelly 3 and turned thereby. The MWD tool 200, electronics module 300, the LWD tool 100 and communication sub 400 are all connected in tandem with drill string 6. Such subs and tools form a bottom hole drilling assembly between the drill string 6 of drill pipe and the drill bit 1.

As the drill string 6 and the bottom hole assembly turn, the drill bit 1 penetrates the borehole 12 through earth formations 8. Drilling fluid or "mud" is forced by pump 17 from mud pit 13 via stand pipe 15 and revolving injector head 7 through the hollow center of kelly 3 and drill string 6, and the bottom hole drilling assembly to the bit 1. Such mud acts to lubricate drill bit 1 and to carry borehole cuttings or chips upwardly to the surface via annulus 16. The mud is returned to mud pit 13 where it is separated from borehole cuttings and the like, degassed, and returned for application again to the drill string 6.

The communication sub 400 receives output signals from sensors of the LWD tool 100 and from computers in the downhole electronics module 300 and MWD tool 200. Such communication sub 400 is designed to transmit coded acoustic signals representative of such output signals to the surface through the mud path in the drill string 6 and downhole drilling assembly. Such acoustic signals are sensed by transducer 27 in standpipe 15, where such acoustic signals are detected in surface instrumentation 14. The communication sub 400, including the surface instrumentation necessary to communicate with it, are arranged as the downhole and surface apparatus disclosed in U.S. Pat. No. 4,479,564 and U.S. Pat. No. 4,637,479, which patents are incorporated herein by reference.

The communication sub 400 may advantageously include the communication apparatus disclosed in U.S. Pat. No. 5,237,540. Such patent is assigned to the assignee of this application and is incorporated herein by reference.

Figure 2:
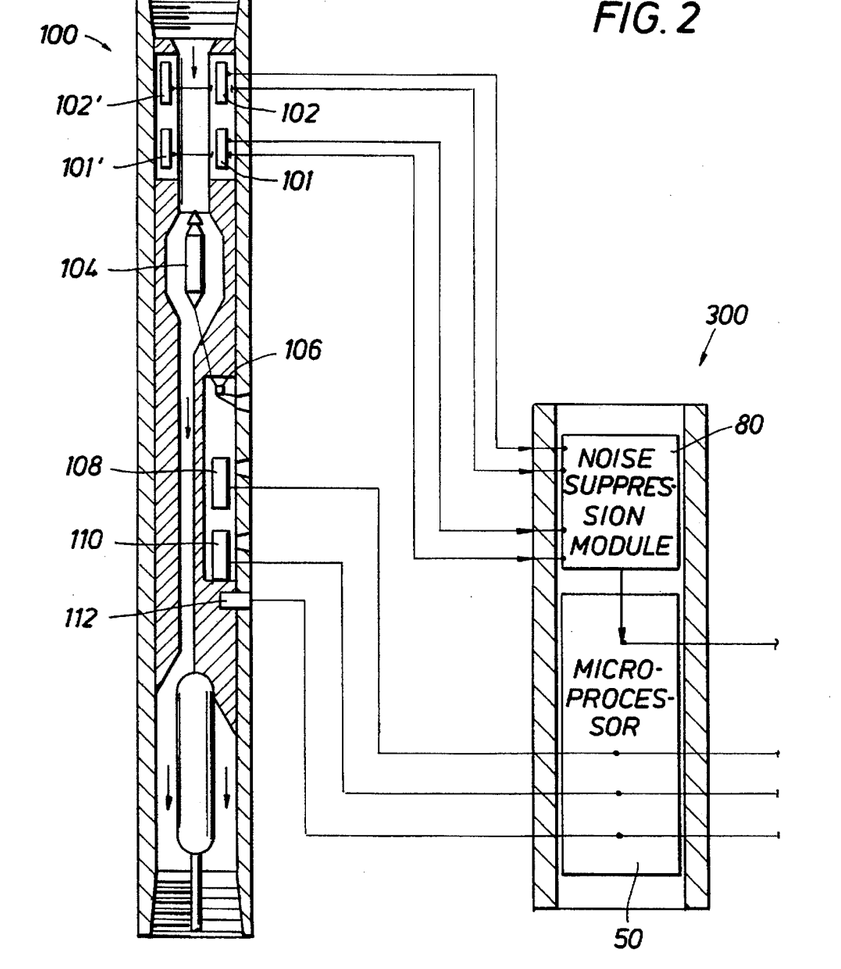
FIG. 2 illustrates a neutron detector system of a logging-while-drilling tool within which the invention is incorporated.

FIG. 2 illustrates the LWD tool 100 of FIG. 1 in a schematic way. The physical structure of the LWD tool body and associated sensors is substantially like that described in U.S. Pat. No. 4,879,463, and U.S. Pat. No. 5,017,778. Both of such patents are assigned to the assignee of the invention described herein. Such patents are incorporated herein for this description of a logging-while-drilling tool, specifically a compensated density neutron tool used in logging-while-drilling measurements of formation characteristics. Stabilizer blades may be provided as an alternative embodiment of the LWD tool 100, where a stabilized tool is required.

The LWD tool 100 includes a source of neutrons 104 disposed axially, and near and far spaced neutron detector arrays. Such arrays include at least two near spaced detectors, 101,101' and at least two far spaced detectors, 102, 102'. Such detectors are spaced radially from each other. The LWD tool 100 also includes a source of gamma rays 106 and short and long spaced gamma ray detector assemblies 108, 110. The preferred LWD tool 100 also includes an ultrasonic transducer 112 for measuring tool standoff from the borehole wall. Such ultrasonic transducer and system is described in U.S. Pat. Re No. 34,975 to Orban, et al. which is assigned to the assignee of the invention described herein. Such patent is also incorporated by reference for its detailed description of an ultrasonic transducer 112 of the LWD tool 100. The electronics module 300, at the option of the designer, may either be part of MWD tool 200 or an independent sub. In the preferred system as described above, it includes a magnetometer section, but more importantly to the invention described herein, it includes a noise suppression module 80 for accepting signals from neutron detectors 101, 101 ', 102, 102' and generating at its output, neutron count rate signals at a respective "near" location and a "far" location spaced from neutron source 104. Module 80 includes a separate channel for processing signals from "far" detectors 102, 102', but for simplicity of illustration and description only, the channel for processing detectors at the near location is described here. Processed neutron count rate signals from noise suppression module 80 are combined in a microprocessor 50 with other signals from magnetometers, accelerometers and ultrasonic detectors to generate borehole characteristics such as density and lithology, as a function of angular distance about the borehole and as a function of depth in the borehole. The signals received in microprocessor 50 are then applied to computer programs stored in memory. Such programs need not be described here but are described in detail in the above mentioned U.S. Pat. No. 5,473,158.

Figure 3:
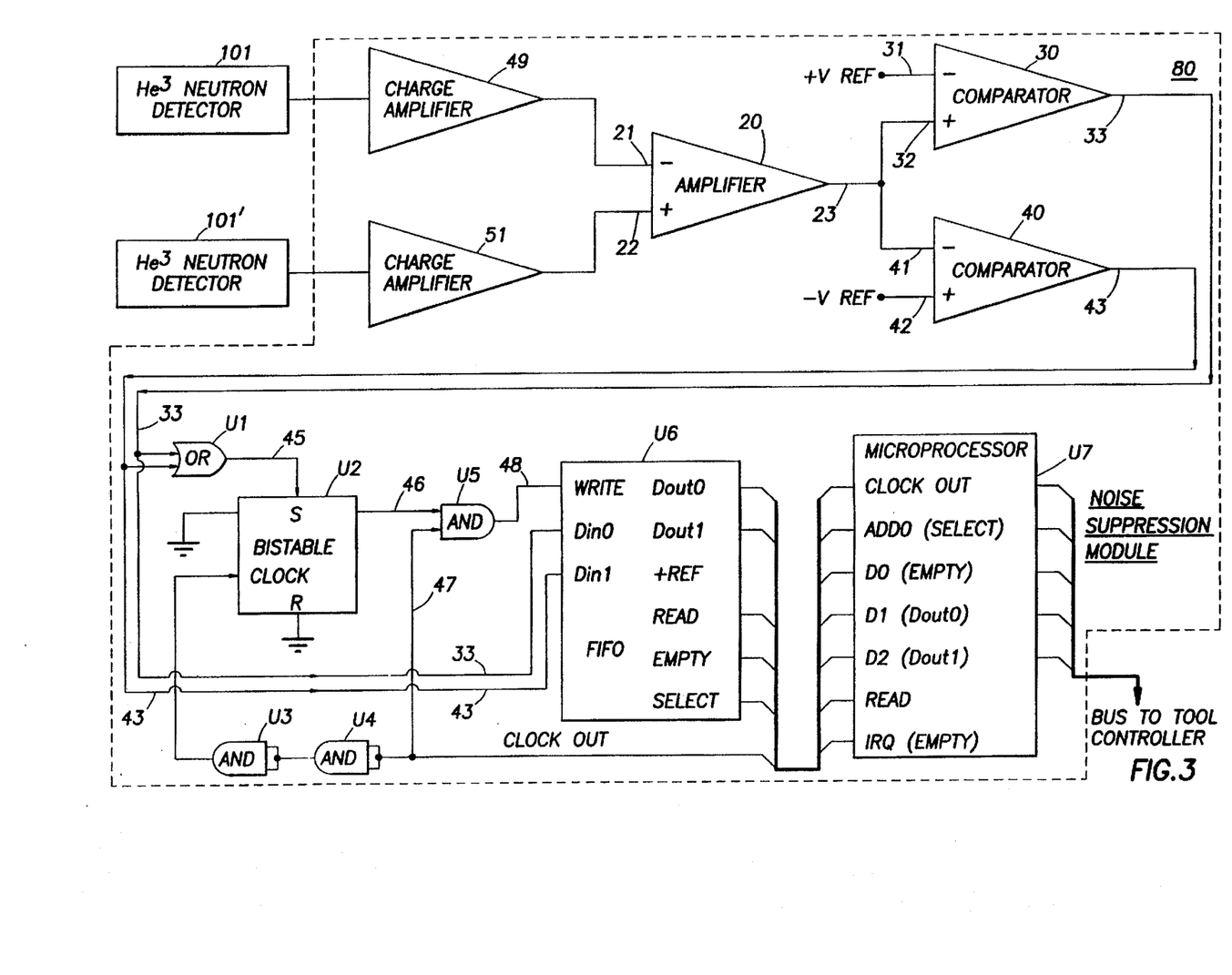
FIG. 3 is a schematic diagram illustrating a microphonic noise suppression module, according to the invention, for proportional counters used in borehole logging-while-drilling apparatus.

Turning now to FIG. 3, two $He^3$ neutron detectors 101, 101 are connected via charge amplifiers 49, 51 to differential amplifier 20. The output of detector 101 and charge amplifier 49 is applied to the inverting input 21 while the output of detector 101' and charge amplifier 51 is applied to the non-inverting input 22. The differential amplifier output on lead 23 is connected to a pair of voltage pulse discriminators 30, 40 via inputs 32 and 41 respectively. Such voltage pulse discriminators are preferably comparators. Discriminator or compactor 30 serves to screen out any positive voltage pulse with a positive voltage magnitude less negative than that of the positive reference voltage connected to input 31. Similarly, discriminator or compactor 40 screens out any negative voltage pulse with a negative voltage magnitude less negative the negative reference voltage connected to input 42. The output leads 33, 43 of discriminators 30, 40 are respectively connected to digital input ports of first-in-first-out buffer (FIFO) U6 and OR gate U1.

The output of OR gate U1 is applied via lead 45 to the "set" input of bistable circuit U2. When either of the discriminators outputs are logic true, bistable circuit U2 will set and produce an enable pulse via lead 46 to one input of the two inputs of AND gate U5. The other input to AND gate U5 is a continuous 3.33 microsecond period clock signal via lead 47 generated by microprocessor U7. The bistable U2 set data via lead 46 causes Din0 and Din1 of FIFO U6 to be written into the FIFO on each clock cycle. Data continues to be clocked into FIFO U6 as long as any discriminator output on either lead 33 or lead 43 is logically true. Because the period of the clock is 3.33 microseconds and valid neutron pulses are in the 10 microsecond range, one to three logical ones ("1") are clocked into the FIFO U6 for valid neutron pulses. If any discriminator output is true for a longer time, more 1 s are clocked into the FIFO. When all discriminator outputs return to the logic 0 state, bistable circuit U2 resets on the next clock cycle and removes the enabling signal via lead 46 to AND gate U5. A slight delay occurs in resetting bistable circuit U2 caused by delay times through gates U3 and U4. This delayed resetting of U2 allows one additional data word of all zeros to be clocked into FIFO U6. Such all zero data word is a termination signature for each detector pulse and prevents "run ons" by any subsequent detector pulses. Because each detector output is connected via leads 33, 43 to a unique input Din0 or Din1 of the FIFO U6, when the FIFO U6 output is read by the microprocessor U7, each bit position is associated with a unique detector's output, and the number of sequential ones ("1") recorded in any bit position is a measure of a detector's pulse width.

The FIFO U6 serves an additional function to synchronize the microprocessor U7 processing speed with the detector data sampling clock. With the FIFO U6 in the circuit, detector data can stack up in the FIFO U6 without loss while the microprocessor U7 is processing a data word. A typical commercial version FIFO circuit U6 can produce words of 9 bits wide stacked 1024 words deep. Therefore, up to nine detectors can be connected to a single FIFO, although only two are illustrated in FIG. 3. Many detector events can be stacked in the FIFO before data is lost. While the arrival of the detector pulses is random, the event rate for LWD logging is low, resulting in an exceedingly small probability of data loss.

The microprocessor U7 detects a data word being written into the FIFO U6 by means of its IRQ input. This IRQ input of microprocessor U7 is connected to the Empty flag output of FIFO U6. When the first data word is written into the FIFO U6, the Empty flag goes low and generates a hardware interrupt in the microprocessor U7. This interrupt initiates the software task to measure the detector pulse duration in time and to detect multiple pulse coincident time. The microprocessor U7 can detect when all the data has been read from the FIFO U6 by checking the D0 bit when it reads data from the FIFO. This bit is also connected to the FIFO Empty flag and is tested on each read of the FIFO U6.

Figure 4:
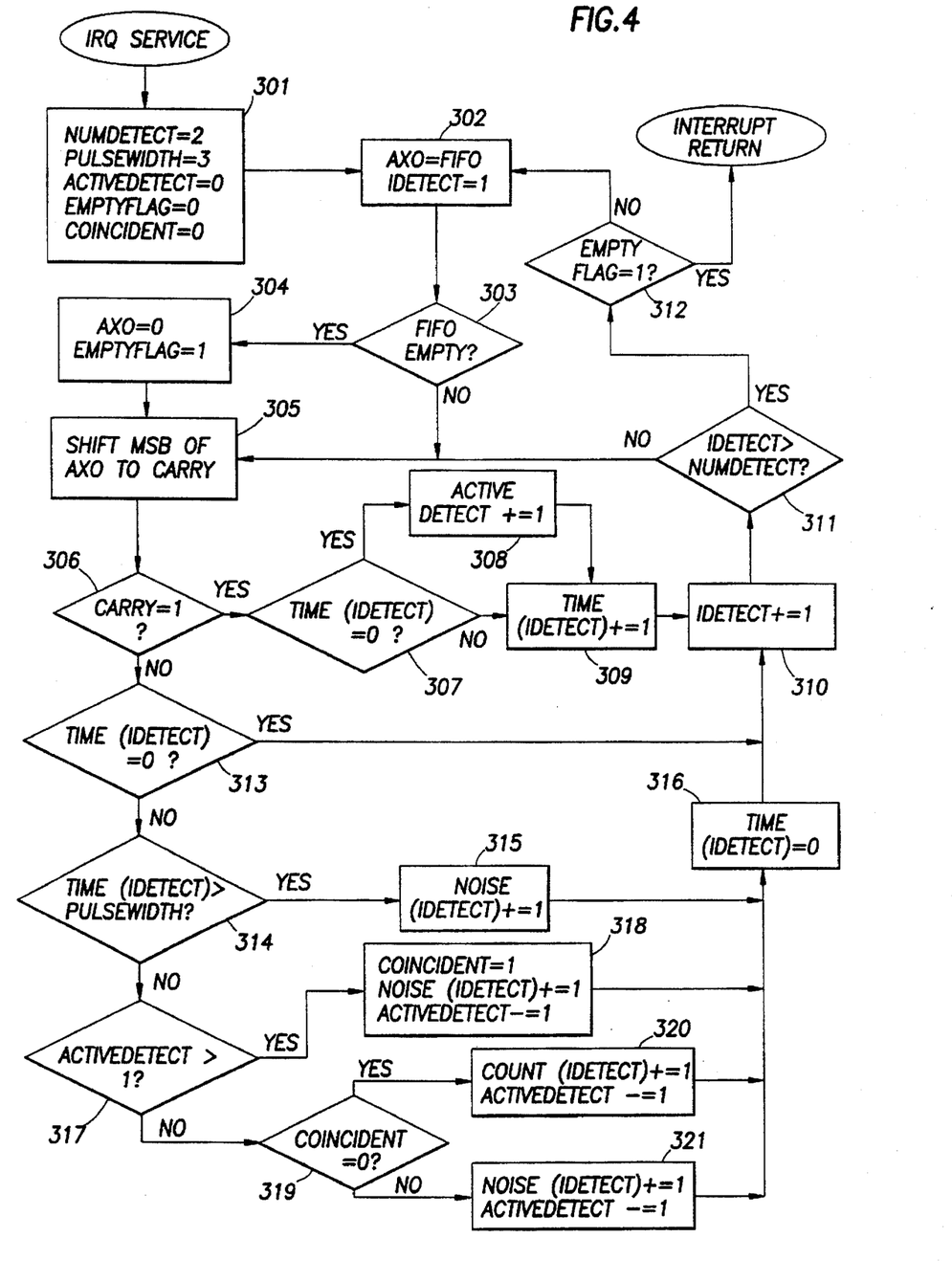
FIG. 4 illustrates a computer program of a microprocessor in the noise suppression module which, in cooperation with the electronic circuits of the module, distinguishes noise generated pulses from neutron generated pulses and establishes a count of neutron pulses.

FIG. 4 is a flow chart of the software internal to the microprocessor U7 that is activated by the interrupt generated at its IRQ input when the Empty flag of FIFO U6 goes low. The role of the software is to read the FIFO and process each detector bit. Each detector bit is tested to determine if it is a 1. If it is a 1, the time counts for that detector are incremented. The incrementing continues until a 1 to 0 transition occurs. At this point the time counts accumulated are tested to determine if the value is less than or equal to the expected value for a valid neutron pulse. If this is the case, a neutron count is indicated. If the time counts are valid, a test for coincidence is made. If coincidence occurs, i.e. more than one detector is active, then a valid neutron count is not recorded. The software continues to read the FIFO U6 until its Empty flag goes high.

To illustrate the logic flow of the software of the flow chart of FIG. 4, four examples using two detectors are presented. Such examples include (1) a single valid detector pulse, (2) a single invalid detector pulse, (3) two valid non-coincident detector pulses, and (4) two coincident pulses. In the table that follows, the first binary word in each column is the first word read out of the FIFO U6 by the microprocessor U7. The data in the FIFO U6 are augmented by the FIFO Empty flag in the right most bit position. The second column entry is the second binary word read and so on. The middle bit of each word corresponds to detector 101' and the left bit to detector 101. In the examples given, only two detectors are used to illustrate the principles of the software. However, the software is not restricted to only two detectors and can be easily extended to additional detectors and FIFOs.

TABLE 1

EXAMPLES OF DETECTOR OUTPUTS

| 1<br>One Valid<br>Pulse | 2<br>One Invalid<br>Pulse | 3<br>Two Valid<br>Pulses | 4<br>Coincident<br>Pulses | Time Read<br>Interval |
|---|---|---|---|---|
| 010 | 010 | 010 | 010 | 1 |
| 010 | 010 | 010 | 010 | 2 |
| 010 | 010 | 010 | 110 | 3 |
| 000 | 010 | 000 | 100 | 4 |
| 001 | 010 | 100 | 100 | 5 |
|  | 000 | 100 | 000 | 6 |
|  | 001 | 000 | 001 | 7 |
|  |  | 001 |  | 8 |

EXAMPLE 1

One Valid Pulse

Table 1 (column 1) illustrates the word stream applied from FIFO U6 to microprocessor U7. The interrupt generated by a word being written into the FIFO causes execution of logic block 301 in the flow diagram of FIG. 4. Logic block 301 sets parameters for the logic flow of the method. A first time interval read of the FIFO is made in logic block 302. The FIFO empty status, bit 0, is tested in logic block 303. Since the FIFO is not empty (e.g.,the right most bit of the FIFO word is zero, the FIFO empty output is low) logic passes to logic block 305. In logic blocks 305, 306 a test of the left most bit is made and a zero is detected. Thus the "carry" bit is not 1 and logic flow passes to logic block 313. Since no time counts have been accumulated for this detector bit, Time (1) is zero and logic blocks 310, 311,305 are executed.

When the software enters logic block 305, the 1 in bit position 1 (e.g., the middle bit of the word 010) is shifted to the carry bit position and logic block 306 tests true. In logic block 307 Time(2)=0 since this is the first time this detector bit has been detected. From logic block 307, execution progresses to logic block 308 setting the ActiveDetect detector counter to 1. Time(2) is incremented in logic block 309. Execution then progresses through logic blocks 310, 311, 312 and 302. In block 302 another word is read from the FIFO and the detector index counter is reset to 1.

The execution path for the 0 in bit position 2 (e.g., the left most bit of the word 010) again is the loop formed by logic blocks 305, 306, 313, 310, 311, 305. For the 1 in bit position 1, the loop includes logic blocks 305, 306, 307, 309, 310, 311, 312, 302, 303, 305. These two loops are repeated for the third read interval of the FIFO U6.

On the fourth read interval of the FIFO, all the bits are zero. Bit 2 processing is again the 305, 306, 313, 310, 311, 305 logic block loop. The loop for bit 1 changes at logic block 306 with a branch to logic block 313 and continues to logic block 314. In logic block 314 a test is made to determine if the time recorded in Time(2) exceeds the valid pulse width. In this example Time(2)=3, not greater than 3, and the software executes logic block 317. Only one detector has been active during this pulse time, and the software executes the logic block path 319, 320, 316, 310, 311, 312, 302. In logic block 320 Count(2) is incremented recording a valid count for detector 101'.

On the fifth time read interval of the FIFO U6, the FIFO empty bit is a "1" in the right most position of the word. This causes execution of logic block 304, setting all detector bits to zero and the EmptyFlag to a 1. The zero bit processing loop of logic blocks 305, 306, 313, 310, 311, 305 is repeated for both detector bits in order to clear all the internal counters and flags.

EXAMPLE 2

One Invalid Pulse

Table 1 (column 2) illustrates the word stream applied from FIFO U6 to microprocessor U7 which proceeds along exactly the same logic paths as Example 1 except that the loops are repeated two more times in read intervals 4 and 5. When the test for pulse width is made in logic block 314, Time(2) is a 5, thus greater than 3. In this case logic block 315 is executed, thereby incrementing the noise counter for detector 101'. A valid neutron count of logic block 320 is not advanced. The termination logic of the previous example is then repeated after the next FIFO read.

EXAMPLE 3

Two Valid Pulses

Table 1 (column 3) illustrates the word stream applied from FIFO U6 to microprocessor U7 where a three interval pulse first appears on detector 101' and then on detector 101. This example starts identically as the two proceeding examples. On the fourth read of the FIFO detector the pulse of detector 101' makes the transition from a 1 to a 0 thereby terminating the timing of detector 101' as in the first example. When detector 101' is recorded in logic block 320, the counter ActiveDetect is simultaneously decremented from 1 to zero. On the fifth FIFO read the detector 101 bit becomes a 1 and time counts are accumulated in Time(1) until the seventh time read interval. In this example Time(1) will be 2 when the bit of detector 101 makes the transition from 1 to 0 and is recorded as a valid Count(1) count. On the next read, all the detector bits are zero and the empty FIFO bit is set. The routine is terminated as described above for the One Valid Pulse example of column 1 of Table 1.

EXAMPLE 4

Coincident Pulses

Table 1 (column 4) illustrates an example word stream from FIFO U6 where two valid pulses overlap in time. This example starts out along the same logic path as the One Valid Pulse example. However, on the third time interval read of the FIFO, the 1 bit of detector 101 becomes active and accumulation of time counts in Time(1) begins in logic block 309. The path in reaching logic block 309 the first time includes logic block 308 which increments ActiveDetect from a 1 to a 2. This indicates that two detectors are active at the same time. On the fourth time interval read of the FIFO the bit of detector 101' goes to a zero thereby terminating the accumulation of time counts in Time(2). The check of pulse width of detector 101', Time(2)=3, in logic block 314 passes execution to logic block 318 via logic block 317 since ActiveDetect=2. In logic block 318 the noise counter of detector 101' is incremented, ActiveDetect is decremented, and the Coincident flag is set to 1.

In the fifth FIFO time interval read, time counts start accumulating in Time(1). On the sixth FIFO time interval read, the 1 to 0 transition of the bit of detector 101 causes the software to take the logic path 313, 314, 317, 319, 320. At logic block 319 the branch to logic block 321 is taken and the detector event is recorded as a noise pulse. The setting of the Coincident flag in logic block 318 when the bit of detector 101' made the 1 to 0 transition causes this branching to logic block 319. As indicated in FIGS. 2 and 3, the count of valid pulses as accumulated in logic block 320 are accumulated as a function of time and passed to microprocessor 50 as a neutron count rate of neutrons striking detectors 101, 101' for example. More $He^3$ detectors may be used in the near detector array and the far neutron detector array.

As described above the method and apparatus of noise suppression module 80 suppresses microphonic noise on $He^3$ detectors in three ways. First, by connecting the outputs of two detectors 101, 101' to differential inputs of a single amplifier 20, a significant amount of coherent microphonically generated noise between the two detectors will be canceled due to its coherence. Undoubtedly, this configuration may also reject coincident neutron pulses of exactly the same width in addition to the coherent microphonic noise. However, the statistical probability of randomly occurring pulses being exactly coincident between detectors is extremely low when the count rate is only a few tens of cps for each detector; therefore, such concern is minimal. On the other hand, it is very likely that the detectors subjected to the same shock will all exhibit coherent microphonic outputs.

Figure 5:
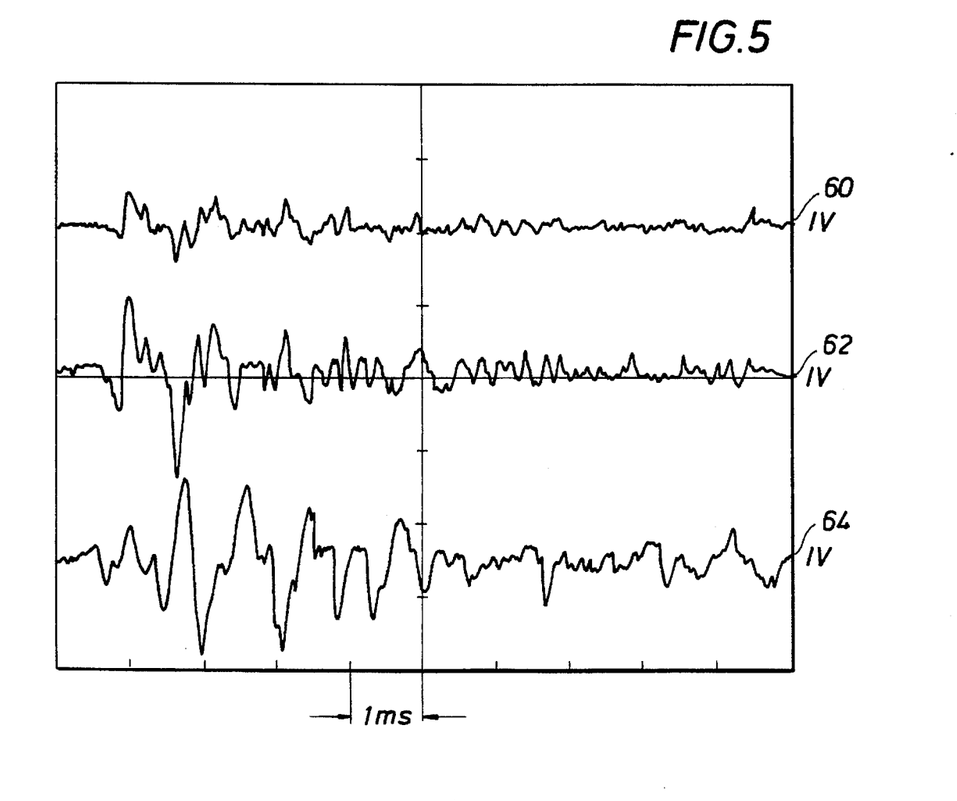
FIG. 5 illustrates the effectiveness of using the arrangement of two detectors to one differential amplifier for reducing microphonic noise.

FIG. 5 illustrates the effectiveness of connecting two detectors to one amplifier configuration. Three traces 60, 62, 64 are shown in FIG. 5. For each of these traces, the detectors are subjected to shocks in excess of 300 G. Traces 62, 64 are from the outputs of one detector connected to one inverting input of an amplifier with the respective non-inverting input being connected to ground (one detector to one amplifier configuration). Trace 60 is from the output of the two detectors to one differential amplifier configuration as described in connection with FIG. 3. As may be observed by comparison of the traces, a dramatic reduction of coherent microphonic noise results from using the two detectors to one amplifier configuration. Another benefit of the arrangement of two detectors differentially connected to one amplifier is the reduction of power consumption from using one amplifier instead of two. Such power consumption reduction is an essential consideration for battery operated downhole tools.

Figure 6A:
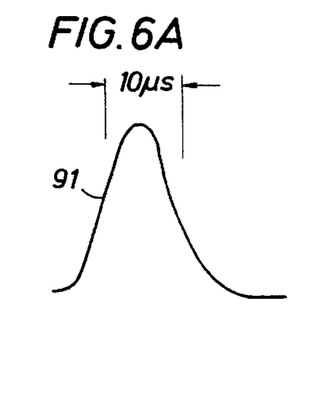
FIGS. 6A–6D illustrate characteristics of a typical neutron detection pulse and a typical pulse which results from microphonic noise.
Figure 6B:
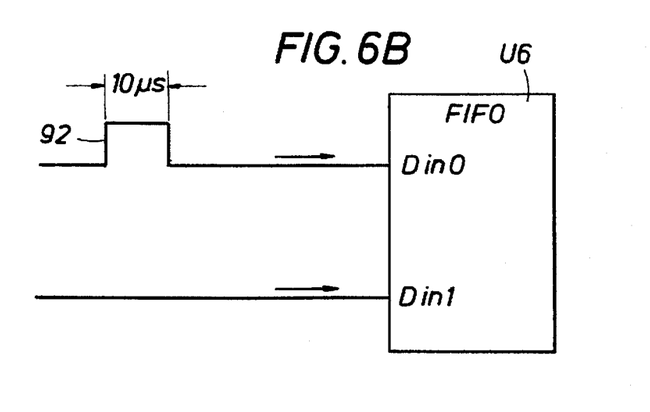
Figure 6C:
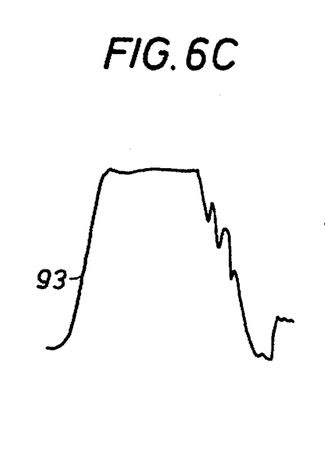
Figure 6D:
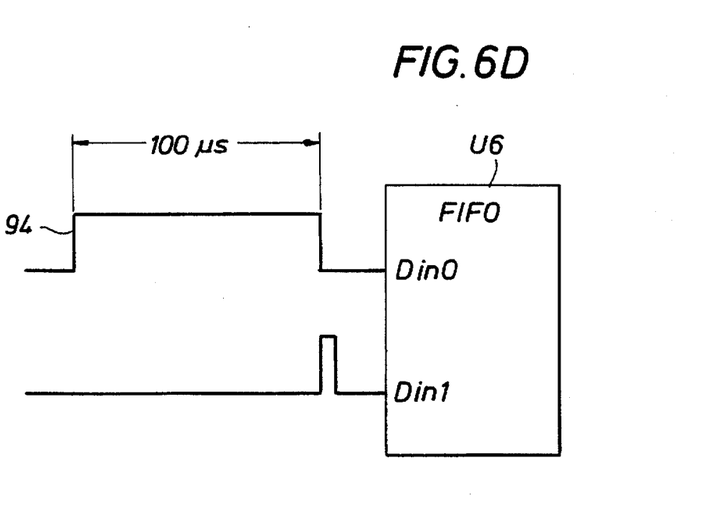

Microphonic noise is suppressed in a second way by noise suppression module 80 by using digital circuit logic with a FIFO circuit U6 in conjunction with microprocessor U7 with software as illustrated in FIG. 4, for detecting and distinguishing a neutron detection pulse from microphonic noise as described above. The software of microprocessor U7 is interrupt driven from the digital output of FIFO U6 to determine if one of the discriminators 30, 40 are in the "tripped" or "1" state, indicating the presence of either a neutron pulse or microphonic noise. If a discriminator is tripped by a pulse 91 (see FIG. 6A) originating from the detection of a neutron, a "neutron pulse" will exist for approximately 3–10 microseconds. The pulse 92 of FIG. 6B, illustrates such a pulse which is applied to input Din0, for example, of FIFO circuit U6. But if the tripped state is a noise pulse 93 (see FIG. 6C) caused by microphonic noise, such "noise pulse" can last for hundreds of microseconds. The pulse 94 of FIG. 6D illustrates a pulse which is applied to the Din0 input of FIFO circuit U6 which is recorded as a noise pulse. Such order of magnitude increase in time for the microphonic noise is due to its origin in mechanical vibrations having typical frequencies in the low kilohertz range. The large time difference between the two tripped states is identified by the software of FIG. 4 of microprocessor U7 so as to distinguish a neutron pulse from a noise pulse. Hence, microprocessor U7 correctly counts the neutron pulses when it responds to an interrupt pulse from FIFO circuit U6 while eliminating counts attributed to microphonic events from the neutron counts.

While normally the length of time for which a discriminator is in the tripped state allows the differentiation between detected neutrons and detected microphonic noise as described above, there is a case which may still be ambiguous. If a noise pulse has an amplitude that exceeds the discriminator level by only a small amount, then the discriminator 30, 40 of FIG. 3 may be tripped only for a short period of time, similar in time to that of a neutron pulse. Therefore, in the third way of eliminating a noise pulse from the neutron count, a secondary level logic is applied by the software of FIG. 4 in microprocessor U7 to distinguish these events. When multiple sets of pulses are applied to microprocessor U7, coincidence pulses between sets are rejected. Such use of time coincidence for rejecting pulses between or among discriminators 30, 40 is also based on the extremely low statistical probability of randomly occurring pulses being coincident between multiple sets of detectors compared with the much higher statistical probability that multiple detectors subjected to the same shock will exhibit microphonic outputs that will be coincident in time.

Various modifications and alterations in the described methods and apparatus will be apparent to those skilled in the art of the foregoing description which do not depart from the spirit of the invention. For this reason, such changes are desired to be included within the scope of the appended claims. The appended claims recite the only limitations to the present invention. The descriptive manner which is employed for setting forth the embodiments should be interpreted as illustrative but not limitative.

What is claimed is:

1. An improved neutron counting arrangement for a neutron detection assembly in a logging-while-drilling tool having at least one neutron detector which produces pulses in response to radiation returning to said tool from formations surrounding a borehole, wherein said pulses are contaminated by microphonic noise, wherein the improvement comprises, means for measuring the time length of an output pulse from said neutron detector, and means for counting said output pulse as a neutron induced pulse only if said time length of said output pulse is less than a predetermined time length.

2. The improved arrangement of claim 1 wherein said means for measuring includes, means responsive to said output pulse from said neutron detector for generating a measurement pulse if the amplitude of said pulse from said neutron detector is greater than or equal to a predetermined level, and means for measuring the time length of said measurement pulse, and wherein said means for counting includes means for comparing the time length of said measurement pulse with said predetermined time length.

3. The improved arrangement of claim 1, wherein said predetermined time length is set to a value less than about 10 microseconds.

4. An improved neutron counting arrangement for a neutron detection assembly in a logging-while-drilling tool having at least two neutron detectors at a common axial position of said tool which produce pulses in response to radiation returning to said tool from formations surrounding a borehole, such tool being subjected to forces which produce microphonic noise pulses from said neutron detectors, and wherein the outputs of said two neutron detectors are connected to respective negative and positive inputs of a differential amplifier, wherein the improvement comprises first and second comparator means connected to the output of said differential amplifier for producing first and second output pulses responsive to pulses applied to said negative and positive inputs of said differential amplifier which are respectively greater than or more negative than predetermined amplitude levels;

means responsive to said first and second output pulses for measuring the time lengths of said first and second output pulses, and means for counting said respective first and second output pulses as neutron counts only if their respective time lengths are less than a predetermined time length.

5. The improved arrangement of claim 4 wherein said predetermined time length is set to a value less than about 10 microseconds.

6. The improved arrangement of claim 4 further comprising means for rejecting both first and second output pulses as neutron counts if said respective first and second output pulses overlap in time.

7. A method for eliminating shock induced pulses from a sequence of radiation induced pulses in the count of pulses from a neutron detector comprising the steps of, measuring the time length of output pulses from said neutron detector, and counting said output pulses as neutron induced pulses only if said length of an output pulse is less than a predetermined time length.

8. The method of claim 7 further comprising the step of modifying a raw signal from said neutron detector to produce an output pulse only if said raw signal is greater in amplitude than a predetermined level.

9. A method for eliminating shock induced pulses from a sequence of radiation induced pulses while counting pulses from a neutron detector comprising the steps of providing a neutron detector assembly in a logging-while-drilling tool including two neutron detectors at a common axial position of said tool with each detector producing pulses in response to radiation returning to said tool from formations surrounding a borehole, said tool being subject to forces which produce microphonic noise pulses in the output of said neutron detectors, applying the outputs of said two neutron detectors to respective negative and positive inputs of a differential amplifier, providing first and second comparator means connected to the output of said differential amplifier for producing first and second output pulses responsive to pulses applied to said negative and positive inputs of said differential amplifier which are respectively greater than or more negative than predetermined amplitude levels, measuring the time lengths of said first and second output pulses, and counting said respective first and second output pulses as neutron counts only if their respective time lengths are less than a predetermined time length.

10. The method of claim 9 further comprising the step of rejecting both first and second output pulses as neutron counts if said respective first and second output pulses overlap in time.

* * * * *